(12) United States Patent
Adkins et al.

(10) Patent No.: US 12,306,981 B2
(45) Date of Patent: May 20, 2025

(54) SYSTEM AND METHOD FOR DATA MANAGEMENT AND SECURITY FOR DIGITAL MANUFACTURING

(71) Applicant: Materialise N.V., Leuven (BE)

(72) Inventors: Chris Adkins, Lexington, KY (US); Joseph Inkenbrandt, San Francisco, CA (US); Stephan Thomas, Mill Valley, CA (US)

(73) Assignee: MATERIALISE N.V., Leuven (BE)

( * ) Notice: Subject to any disclaimer, the term of this patent is extended or adjusted under 35 U.S.C. 154(b) by 0 days.

(21) Appl. No.: 18/509,727

(22) Filed: Nov. 15, 2023

(65) Prior Publication Data

US 2024/0086561 A1 Mar. 14, 2024

Related U.S. Application Data

(63) Continuation of application No. 17/246,053, filed on Apr. 30, 2021, now Pat. No. 11,861,026, which is a
(Continued)

(51) Int. Cl.
*G06F 21/62* (2013.01)
*B33Y 10/00* (2015.01)
(Continued)

(52) U.S. Cl.
CPC .......... *G06F 21/6218* (2013.01); *B33Y 10/00* (2014.12); *B33Y 30/00* (2014.12);
(Continued)

(58) Field of Classification Search
CPC .... G06F 21/6218; G06F 30/20; G06F 21/121; G06F 21/6281; B33Y 10/00;
(Continued)

(56) References Cited

U.S. PATENT DOCUMENTS 8,286,236 B2 10/2012 Jung et al.
8,429,754 B2 4/2013 Jung et al.
(Continued)

FOREIGN PATENT DOCUMENTS

EP 2875932 A1 5/2015

OTHER PUBLICATIONS

WO, International Search Report and Written Opinion of Nov. 20, 2018, International Application No. PCT/US2018050653.
(Continued)

*Primary Examiner* — Techane Gergiso
(74) *Attorney, Agent, or Firm* — Dinsmore & Shohl LLP

(57) ABSTRACT

A method and system for providing secure delivery, transport, modification, exchange of digital design and build files that have been bundled into a digital asset within a complex digital supply chain. The system also provides for quality standards when the digital asset is used to manufacture a physical part, and provides for secure feedback to stakeholders for the purpose of digital logistics, data analytics, or liability. The system includes, but is not limited to, manufacturing, licensing, modification and delegation policy, generating authorization certificates, authenticating manufacturing devices and provide qualitative and quantitative file consumption data.

18 Claims, 9 Drawing Sheets

Related U.S. Application Data continuation of application No. 16/128,988, filed on Sep. 12, 2018, now Pat. No. 11,023,608.

(60) Provisional application No. 62/590,088, filed on Nov. 22, 2017, provisional application No. 62/559,317, filed on Sep. 15, 2017.

(51) Int. Cl.

| | | |
|---|---|---|
| *B33Y 30/00* | (2015.01) | |
| *G06F 21/12* | (2013.01) | |
| *G06F 30/20* | (2020.01) | |
| *H04L 9/06* | (2006.01) | |
| *H04L 9/32* | (2006.01) | |
| *H04L 9/40* | (2022.01) | |
| *H04L 9/00* | (2022.01) | |

(52) U.S. Cl.
CPC ........ *G06F 21/121* (2013.01); *G06F 21/6281* (2013.01); *G06F 30/20* (2020.01); *H04L 9/0643* (2013.01); *H04L 9/3239* (2013.01); *H04L 9/3268* (2013.01); *H04L 63/101* (2013.01); *H04L 9/50* (2022.05); *H04L 63/105* (2013.01); *H04L 2209/60* (2013.01)

(58) Field of Classification Search
CPC ..... B33Y 30/00; H04L 9/0643; H04L 9/3239; H04L 9/3268; H04L 63/101; H04L 9/50; H04L 63/105; H04L 2209/60
See application file for complete search history.

(56) References Cited

U.S. PATENT DOCUMENTS

| | | | |
|---|---|---|---|
| 8,752,166 B2 | 6/2014 | Jung et al. | |
| 9,071,436 B2 | 6/2015 | Jung et al. | |
| 9,128,476 B2 | 9/2015 | Jung et al. | |
| 9,558,330 B2 | 1/2017 | Pogorelik et al. | |
| 9,948,682 B2* | 4/2018 | Anton | H04L 63/10 |
| 11,023,608 B2* | 6/2021 | Adkins | G06F 21/121 |
| 2005/0149733 A1 | 7/2005 | Catherman | |
| 2005/0206500 A1 | 9/2005 | Ferren et al. | |
| 2006/0031252 A1 | 2/2006 | Ferren et al. | |
| 2009/0076642 A1 | 3/2009 | Ferren et al. | |
| 2009/0164379 A1 | 6/2009 | Jung et al. | |
| 2009/0165127 A1 | 6/2009 | Jung et al. | |
| 2010/0031351 A1 | 2/2010 | Jung et al. | |
| 2010/0076582 A1 | 3/2010 | Ferren et al. | |
| 2010/0169639 A1 | 7/2010 | Jeffries | |
| 2011/0178619 A1 | 7/2011 | Jung et al. | |
| 2011/0273307 A1 | 11/2011 | Aune et al. | |
| 2013/0283043 A1 | 10/2013 | Chen et al. | |
| 2014/0095886 A1* | 4/2014 | Futral | G06F 21/57 713/187 |
| 2014/0156053 A1 | 6/2014 | Mahdavi et al. | |
| 2014/0223583 A1 | 8/2014 | Wegner et al. | |
| 2014/0283104 A1* | 9/2014 | Nilsson | H04N 1/32117 726/26 |
| 2014/0337985 A1 | 11/2014 | Muyshondt | |
| 2015/0200916 A1* | 7/2015 | Tomokage | H04L 41/28 713/168 |
| 2015/0309502 A1 | 10/2015 | Breitgand et al. | |
| 2015/0350278 A1 | 12/2015 | Isbjornssund | |
| 2015/0367955 A1 | 12/2015 | Ngo | |
| 2016/0180061 A1* | 6/2016 | Pogorelik | G05B 19/4099 713/189 |
| 2016/0321594 A1 | 11/2016 | Linde | |
| 2018/0001570 A1 | 1/2018 | Cahn | |
| 2018/0012311 A1* | 1/2018 | Small | B22F 10/39 |
| 2018/0069899 A1* | 3/2018 | Lang | G06F 40/186 |
| 2018/0096175 A1 | 4/2018 | Schmeling | |
| 2018/0136633 A1 | 5/2018 | Small | |
| 2018/0173203 A1 | 6/2018 | Freer et al. | |
| 2019/0061261 A1* | 2/2019 | Chanclon Fernandez | B33Y 30/00 |
| 2019/0077084 A1 | 3/2019 | Granados Asensio | |
| 2019/0278878 A1 | 9/2019 | Sawyer | |
| 2020/0119907 A1 | 4/2020 | Graichen | |
| 2020/0151355 A1* | 5/2020 | Balinsky | G06F 21/6227 |
| 2020/0171750 A1* | 6/2020 | Beckmann | B29C 64/386 |
| 2020/0202467 A1* | 6/2020 | Salvo | G06F 16/22 |
| 2021/0086451 A1* | 3/2021 | Carbone | B33Y 50/02 |

OTHER PUBLICATIONS

Jia, L. et al., "AURA: A Programming Language for Authorization and Audit," in ACM SIGPLAN Notices, Sep. 22, 2008, retrieved from https://repository/upenn.edu/cgi/viewcontext.xgi@article=1616 &context=cis_papers.

* cited by examiner

Merkle tree connecting block transactions to block header merkle root

SYSTEM AND METHOD FOR DATA MANAGEMENT AND SECURITY FOR DIGITAL MANUFACTURING

CROSS-REFERENCE TO RELATED APPLICATIONS

This application is a continuation of and claims priority to U.S. application Ser. No. 17/246,053, which was filed Apr. 30, 2021, which is a continuation of and claims priority to U.S. application Ser. No. 16/128,988, which was filed Sep. 12, 2018, and is related to and claimed priority to United States Provisional Patent Application No. 62/559,317, which was filed Sep. 15, 2017 and 62/590,088, which was filed Nov. 22, 2017. The disclosure of the applications are herein incorporated by reference in their entirety and for all purposes.

FIELD

The present disclosure relates generally to digital manufacturing systems and more specifically, but not exclusively, to processing and protecting digital design files and build files, ensuring adherence to predefined quality parameters, and enabling data feedback to stakeholders in a digital supply chain including, but not limited to, design IP holders, design distributors, manufacturing device manufacturers, and manufacturing device consumable suppliers.

BACKGROUND

Digital manufacturing enables the creation of products through an integrated, computer-based system. These integrated systems are often referred to as cyber-physical systems that integrate physical hardware with software systems, often with the use of a network.

As an example of digital manufacturing, additive manufacturing (AM) relies on a digital thread, which advantageously allows for rapid communication, iteration, and sharing of a design model and its corresponding physical representation. Creators of these designs generally use Computer Aided Design (CAD) tools to generate digital designs that can be both visualized on the computer and translated into build files (e.g., using Computer Aided Manufacturing (CAM) tools). A CAD model in the additive manufacturing chain includes valuable information because it includes all of a part's geometric data—information that is highly susceptible to cyber-attacks. In the case of three-dimensional (3D) printers, CAM tools are also known as slicers.

CAD files can be used to create other build files, including, for example, STereoLithography (.STL) files, additive manufacturing file format (AMF) files, toolpath files, and so on. The build files can be used by physical manufacturing devices—such as 3D printers, laser cutters, and Computer Numerical Control (CNC) routers—to directly manufacture the physical product. This technology can be more efficient than conventional manufacturing techniques and allow for immediate and customized production close to the point of use (e.g., via modification of the design or build files).

The build files are often sent to these machines through a network or directly by using computing or storage devices. However, the digital transport of these high value design or build files may not be protected and can result in misuse such as unauthorized production, poor quality production, illegal or undesired transformation, and/or unlicensed distribution. Stated in another way, the digital thread of conventional digital manufacturing is highly susceptible to cyber-attacks, which can affect both the physical and digital world. These cyber-attacks can include corruption/encryption, scaling, indents/protrusions, vertex movement, voids, and so on.

In addition, as digital manufacturing devices are highly configurable, the properties of the manufactured products will vary greatly depending on the settings, calibration, and installed software of these machines. Errors in production may result from changes to the settings, calibration, or installed software on the digital manufacturing devices. For example, a user may unintentionally change the settings on a device to settings that are sub-optimal or incorrect for a particular build; a machine may become mis-calibrated through use, particularly in harsh environments; or bugs may exist in the software.

As a consequence, whether through a malicious cyber-attack, intentional unauthorized production, or through the unintentional introduction of hardware or software errors, the physical products produced by digital manufacturing devices are highly susceptible to errors and failures. These errors and failures have a number of negative consequences. Most catastrophically, an undetected manufacturing error could result in serious injury or property damage when the resulting product is used. Errors also may result in less efficient manufacturing processes, for example, when the manufacturing process must be re-done because the first attempt resulted in a faulty product, or longer production times needed to check for and address possible errors and defects. High production failure rate is known as a particular problem for many digital manufacturing devices, and the threat of cyber-attacks has been recognized as a specific problem for digital manufacturing devices as well. As an example, see Sturm, L. D., et al., "Cyber-physical Vulnerabilities in Additive Manufacturing Systems," 2014, available at https://docs.google.com/a/vt.edu/viewer?a=v&pid=sites&srcid=dnQuZWR1fGN5YmVyLXBoeXNpY2FsbsbsbVj dXJpdHlzeXNOZWlzbWZnfGd4OjE2NzI2MzYzMzdjNzJiOWY.

As an additional drawback, conventional systems fail to provide a simple and secured way to receive feedback data from the manufacturing process to the owners/creators of the designs to optimize them or the distributors of a design or build file for supplier quality assurance or performance. Another problem of conventional systems is that they do not easily integrate with existing applications, programs, and workflows. This makes the systems inefficient and expensive.

Furthermore, conventional systems focus only on the protection of the designs through streaming technology, thereby limiting security and reliability in an industrial manufacturing environment. Existing systems also focus on the licensing rules, not the manufacturing rules nor manufacturing data feedback. Finally, existing solutions rely on securing the communication pipes between a distributor database and the destination and not on building a stand-alone secure digital asset that can be transmitted without the need for secure communication pipe (e.g., via email or a USB thumb drive).

Furthermore, with globalization and digitization of manufacturing, complex products often require dozens and sometimes hundreds of subcontractors to provide parts and sub-assemblies. Tracking the provenance of each part throughout the supply chain is very difficult if not impossible when the subcontractors use different data collection methods that are often proprietary and are physically spread across the globe.

Often, producers must assure the quality of the entire system. From the end customer perspective, there is growing concern on the provenance of raw materials as well as the human rights afforded to employees of the entire supply chain. Conventionally, complex legal contracts that stipulate requirements for all subcontractors can be used to avoid these issues. However, the practical enforcement of the contact is difficult without data and knowledge of each subcontractor's operation. The insertion of counterfeit goods within a supply chain is common and very difficult to expose. These concerns are even more complex with the advancement of digital manufacturing.

In view of the foregoing, a need exists for an improved digital manufacturing system and method for secure exchange, transform, and delegation of digital design and build files in an effort to overcome the aforementioned obstacles and deficiencies of conventional data distribution and management systems.

Figure 1:
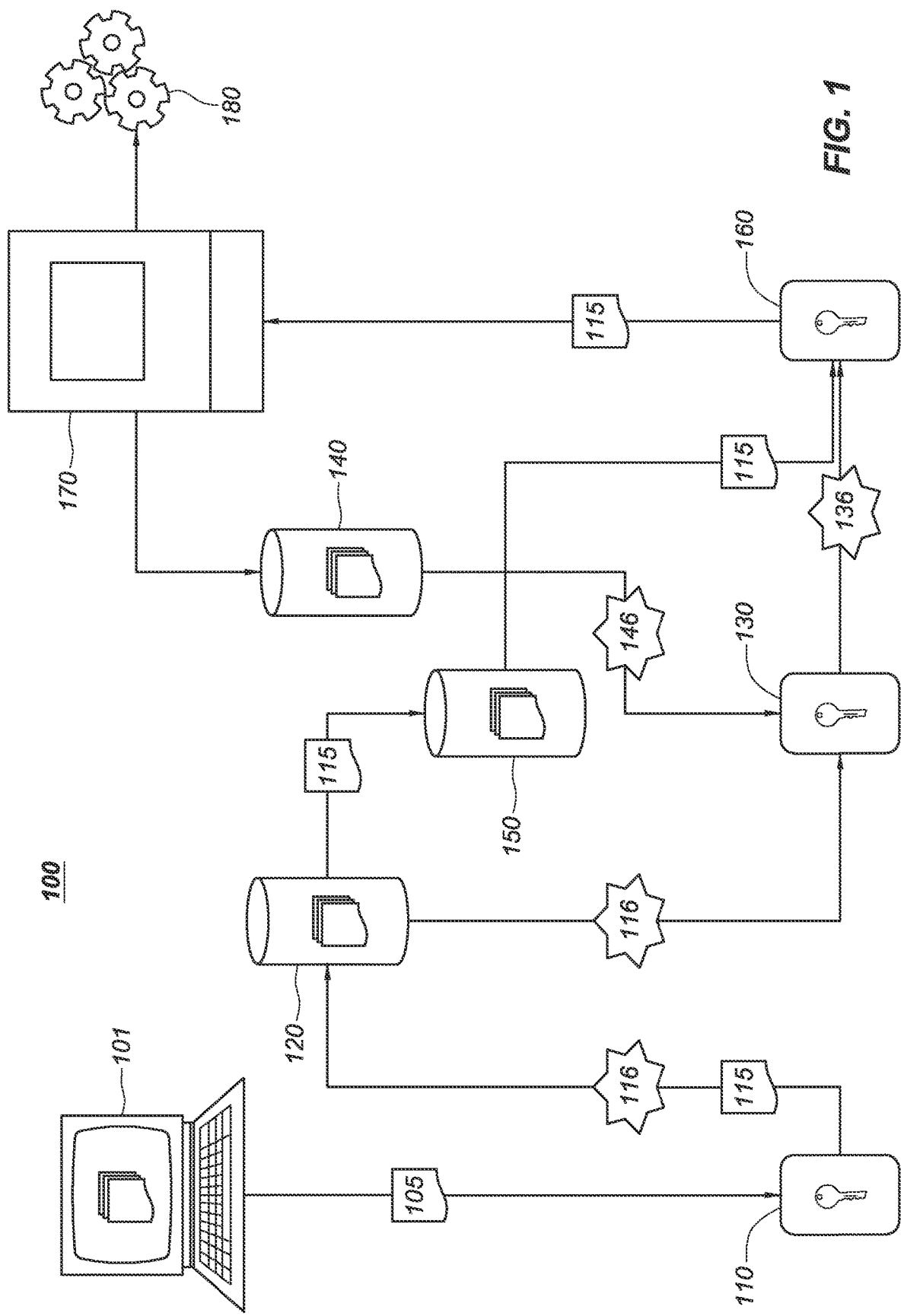
FIG. 1 is an exemplary top-level block diagram illustrating an embodiment of a digital manufacturing system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Currently-available digital manufacturing systems are deficient because, among other reasons, they fail to securely transfer design/build files and receive feedback data; accordingly, a digital manufacturing system that provides secure exchange, transform, delegation of digital design and build files, adherence to defined manufacturing parameters, ease of auditability and customer insight into the history of all stages of a product, and secure manufacturing process data feedback to stakeholders in a digital supply chain can prove desirable and provide a basis for a wide range of digital manufacturing applications, such as manufacturing, using, and selling designs and consumables according to a creator's/owner's minimum criteria and quality level.

Various benefits of the systems and methods disclosed herein will be readily apparent to one of ordinary skill in the art. For example, the systems and methods disclosed herein allow for the integration of various security measures into a digital manufacturing system in an automated fashion without disturbing existing digital workflows. The applications disclosed herein need not replace any applications currently used in the workflow, but may instead integrate with those existing applications to provide security and access control of digital files based on customer requirements. The systems and methods disclosed herein also may improve the technical performance of digital manufacturing devices and solve specific technical problems that have plagued those devices. For example, the systems and methods disclosed herein minimize or prevent the introduction of a variety of manufacturing defects, whether introduced through intentional misconduct or otherwise. This solves recognized problems of high failure rates and high vulnerability to manufacturing defects, unauthorized production, and cyber-attacks affecting digital manufacturing devices. The systems and methods thus improve the reliability of digital manufacturing devices, and the security and efficiency of digital manufacturing processes. By allowing for fully automated processes, along with the ability for the user to exercise precise and customizable control over various aspects of the processes disclosed herein, the systems and methods disclosed herein provide further solutions to the technical problems of inefficiency, increased production time, and lack of scalability specific to conventional digital manufacturing systems.

These and other beneficial results can be achieved, according to one embodiment disclosed herein, by a digital manufacturing system 100 as illustrated in FIG. 1.

Turning to FIG. 1, the digital manufacturing system 100 includes a network device 101, which can be a computer, a mobile phone, a handheld tablet device, or any other mobile network device capable of accessing a network. The network device 101 can be used to produce data, such as a source data file 105 (e.g., 3D object data file, design file, build file, and so on) that is suitable for digital manufacturing. The network device 101 can also run a protection application 110. In some embodiments, the protection application 110 provides encryption of the source data file 105 (such as by creating an encrypted file 115) and documents, manufacturing and licensing policies (e.g., predefined rules). In a preferred embodiment, the encrypted file 115 includes one or more digital supply item ("DSI") files, which can include the corresponding manufacturing and licensing policies and will be further discussed below with reference to FIG. 5.

In a preferred embodiment, the protection application 110 can also include the modeling application that is used to create the object data file 105. The protection application 110 can be installed on the network device 101 or accessed through an interface with a cloud based hosting solution (not shown).

When generating the encrypted file 115, the modeling application 110 can also produce a lock certificate or license, such as a protection authorized policy list (APL) (not shown), which can be moved or sent to any storage database 120. In one embodiment, the protection APL is unique and associated with the encrypted file 115. In some embodiments, the protection APL includes a configuration file that exists within the protection application 110.

In some embodiments, the protection APL can include a certificate, a license, and/or an APL file. In a preferred embodiment, a selected APL is an extensible markup language (XML) file (such as defined by the W3C's XML 1.0 Specification or other open standards), representing various policy parameters and values (discussed below), and includes a digital cryptographic signature of all information in the APL to maintain data integrity.

The protection APL may comprise information that describes features and parameters of an instance of the protection application 110. For example, in some embodiments, parameters of the protection APL can describe signing key information (e.g., public key SN of a signing key, a company name, and a key role). A signing key from the protection application 110 can be used to create the digital signature of the protection APL. The digital signature can include an asymmetric public/private key pair, such as an RSA.

The encrypted file 115 can be sent to a delivery portal 150 for future production, which includes, but is not limited to, a public or private web based marketplace, a secured library of designs internal to a private network, or any system enabling the storage and retrieval of files. An authorization APL 116 is sent to a management application 130 that authorizes production to an enforcement application 160 via the delivery portal 150 if all criteria defined in the authorization APL are met. The authorization APL 116 can be generated when the encrypted file 115 is created by the protection application 110. In some embodiments, the authorization APL 116 may comprise information from the protection APL, for example, that describes features and parameters of the instance of the protection application 110. For example, in some embodiments, parameters of the authorization APL can describe APL information, authorizer identification, information on the protection application 110 (which was included in the protection APL), transform identification, information on the manage application 130, trace identification, information regarding the encrypted file 115, manufacturing parameters, and licensing parameters. A signing key from the protection application 110 or the manage application 130 can be used to create the digital signature of the authorization APL. The digital signature can include an asymmetric public/private key pair, such as an RSA.

In other words, the authorization APL 116 provides rights for the enforcement application 160 to access encrypted files within the encrypted file 115 as well as set manufacturing parameters and enforce licensing rules for access of the encrypted file 115. In an alternative embodiment, the authorization APL 116 sets manufacturing parameters and enforce licensing rules for machine features and processes that do not involve accessing files from the encrypted file 115. For instance, the authorization APL 116, when processed by the management application 130 controls whether or not the machine accepts the encrypted file 115 for producing parts. In another example, when the management application 130 processes the authorization APL 116, the management application 130 controls whether the machine produced parts or under what circumstances the machine can produce parts (e.g., a limit on number of parts or time allowed to produce parts). In another example, the authorization APL 116, when processed by the management application 130, controls whether certain features of a machine were enabled when producing parts from a non-encrypted file 115—based build file. The mechanism by which the management application 130 controls these processes, via generation of a second authorization APL sent to an enforcement application 160, is described further below.

Although not shown, a manage APL can also be used to describe all features and parameters of an instance of the manage application 130. In some embodiments, the manage APL includes a configuration file maintained in the respective manage application 130 it represents. The protection application 110 can request an updated manage APL from a selected manage application 130 at any time. In some examples, the parameters of the manage APL include a manage site name, signing key information, encryption key information, manage location (e.g., URL), DAM URL, trace URL, manage type, and information on the registered machine and model list. A signing key from the manage application 130 can be used to create the digital signature of the manage APL.

Similarly, although not shown, an enforce APL can be used to describe all features and parameters of the enforcement application 160.

In order to authorize production to the enforcement application 160, a manufacturing device 170 is registered and/or identified in a device database 140 through its unique identifier. Once the management application 130 matches the requirement of the authorization APL 116 to the device certificate 146, the management application 130 authorizes production on the manufacturing device 170 by providing a second authorization APL 136 to the enforcement application 160.

The second authorization APL 136 can be created when a license of the encrypted file 115 is distributed by the management application 130 (either for delegation to another instance of the management application 130 or for authorization of production by the enforcement application 160). The second authorization APL 136 can be linked or associated to the encrypted file 115 by a universally unique identifier (UUID) of the encrypted file 115. The protection application 110 can define all parameters included in the second authorization APL 136. When the management application 130 licenses the encrypted file 115 to another application, any optional parameters that are not defined by the current management application 130 can be set. Additionally, any values set by the current management application 130 can be restricted. In some embodiments, parameters of the authorization APL 136 can describe parameters from the protection application 110, encrypted file 115 identification (e.g., file information block), manufacturing parameters (e.g., machine manufacturer, a machine model, and so on), licensing information (e.g., an authorized user, expiration date, quantity, owner of the encrypted file 115, and so on). The encrypted file 115 identification (e.g., file information block) can represent public identifier items such as the UUID of the encrypted file 115, the design name, user customizable identifiers, design description, and so on. Accordingly, a non-trusted storage database 120 or delivery portal 150 can read this information and display it to the user. The file information block includes details on the encryption key used, the file names, the compression method, a hash digest of each file, and so on. All information in the file information block can is treated as confidential and can be encrypted. A signing key from the protection application 110 or the management application 130 can be used to create the digital signature of the authorization APL 136.

Once the authorization APL 136 and its associated encrypted file 115 are sent to the enforcement application 160, the enforcement application 160 verifies parameters in the authorization APL 136 to authenticate the device to be used and provide the ultimate authorization to manufacture. If successfully authorized, an enforcement APL 146, and its associated encrypted files, is decrypted and sent from the enforcement application 160 to the manufacturing device 170 if the manufacturing device 170 is set to the parameters established by the protection application 110. Generally, the device on which the enforcement application 160 resides can be referred to as a network client. In one embodiment, the enforcement application 160 can be embedded in the firmware of the manufacturing device 170, in others it is embedded in the controller of the manufacturing device, and/or a standalone set-top box.

The enforcement APL 146 may comprise information that describes features and parameters of an instance of the enforcement application 160. For example, in some embodiments, parameters of the protection APL 116 can describe signing key information (e.g., public key SN of a signing key, a company name, and a key role), encryption key information, machine manufacturer, machine model, machine serial number, family, machine type, device name, device ID, and users. A signing key from the enforcement application 160 can be used to create the digital signature of the enforcement APL 146.

The encrypted file 115 is decrypted and the manufacturing device 170 can produce the object 180 designed in the encrypted file 115.

Figure 2:
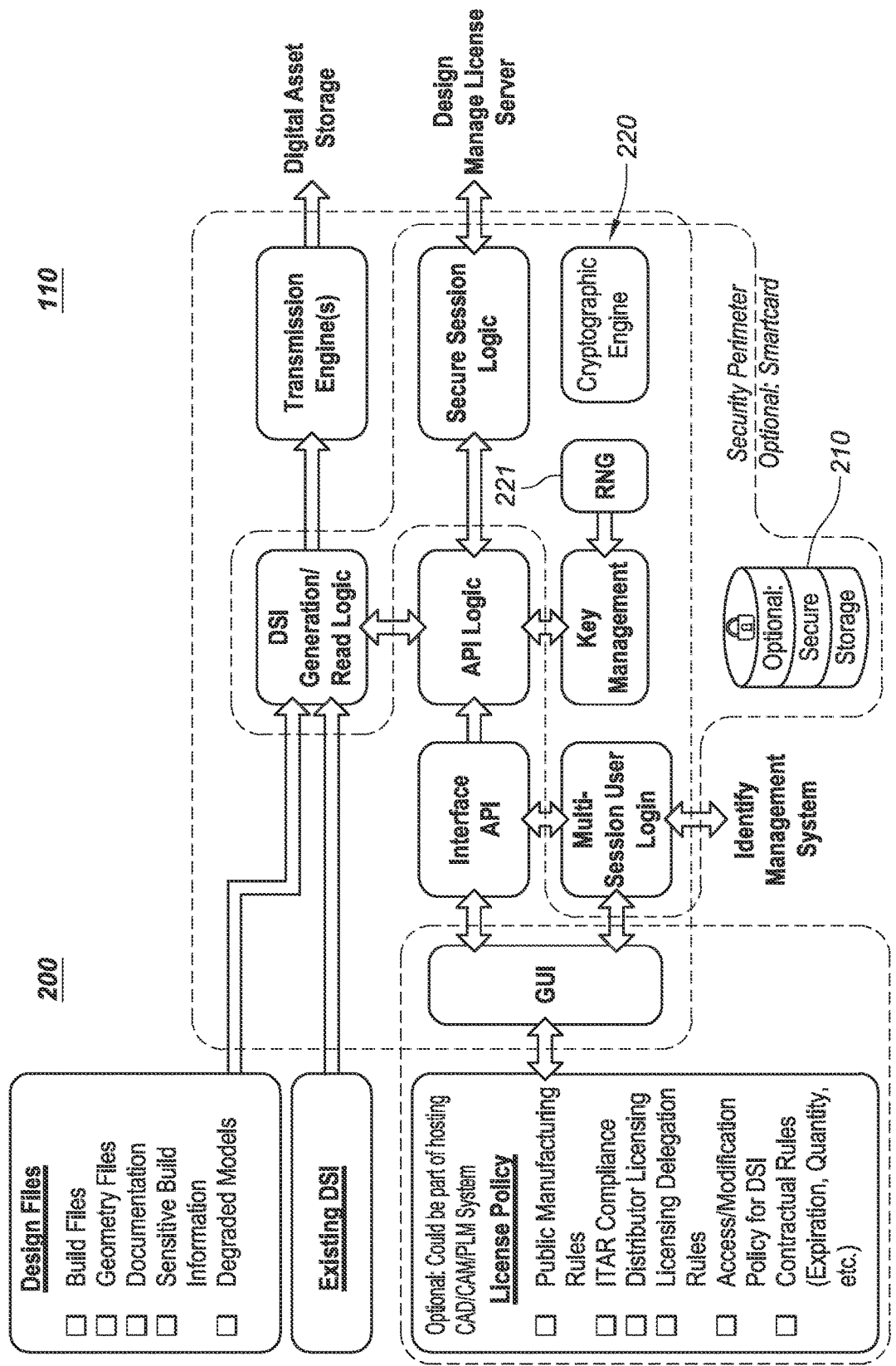
FIG. 2 is an exemplary top-level block diagram illustrating the protection component of the digital manufacturing system of FIG. 1.

Turning to FIG. 2, an exemplary top-level diagram of the protection application 110 of FIG. 1 is shown as a protection component 200. The protection component 200 provides the main interface from post processors, product lifecycle management (PLM) systems, and/or other design products to a secure system for protecting the encrypted file 115. For example, the protection component 200 can create and/or edit the encrypted file 115 to provide a container of files and communicate with a management license server 300 (shown in FIG. 3), such as the management application 130, for all licensing, key storage, and reporting processes.

Further regarding FIG. 2, design files and policy data can be imported into the protection application 110 in any means, such as being received automatically through a network socket, a command line, scripting interface, a graphical user interface (GUI), and/or directly through manual importation. Existing digital supply item ("DSI") files can also be loaded into the protection application 110 for modification. The protection application 110 can also create the encrypted file 115 by taking one or more design files and generating a symmetric key. A benefit of the systems and methods disclosed herein is that they may integrate with existing applications, allowing any application that creates digital files to incorporate those digital files into the encrypted file 115. For any application that consumes digital files, the systems and methods disclosed herein may decrypt only the files required by the application from the encrypted file 115 and only allow the application to perform operations allowed by the authorized user.

The protection component 200 includes a high entropy key generation module, such as a cryptographic engine 110, and a random number generator (RNG) 221 for generating the unique symmetric encryption keys. The protection component 200 further includes a storage device (such as the storage 210 shown in FIG. 2) for maintaining the signature generation and encryption keys.

As shown in FIG. 2, a security parameter represents those components that pushed to a removable backup storage device (not shown) in the event of a security threat and/or based on predefined requirements. As an example, an individual smart card can be used for each user so that each user is responsible for the credentials to unlock their respective smart card.

The protection component 200 can run in a stand-alone mode or as a "plug-in" to CAM/post processing, PLM, and/or CAD products. Accordingly, not all features shown in FIG. 2 are necessary (e.g., optional GUI interfaces).

Once the encrypted file 115 has been created, the digital manufacturing system 100 can register the encrypted file 115 with a license server, such as the management application 130. The license server can provide access, distribution, and reporting policy control for digital assets. For example, a license is created by the content owner and issued to a specific target to be stored in association with that target. In some embodiments, the license is only transported among the components with the authorization APL 136. Stated in another way, once the authorization APL 136 is used, the digital manufacturing system 100 no longer recognizes the authorization APL 136 as valid and cannot be used to re-confer rights.

In a preferred embodiment, the license server can maintain a licensing network as a node network. In this example, asset licenses can be sent downstream in the node network. Nodes can also interact with one another only when they register with each other. This registration can reflect a contract between two nodes and also sets a policy on how these nodes interact with another (e.g., how asset licenses flow between them).

The license server supports at least three levels of trust between nodes: (1) most trusted link; (2) semi-trusted link; and (3) untrusted link. For the most-trusted link level, as licenses are issued downstream, the symmetric key can be sent with the license and stored in the corresponding node. For the semi-trusted link level, a license is issued downstream along with the symmetric key; however, a heartbeat is required to be received at a predetermined amount of time or the license is revoked. This can address those recipient systems that are offline or have limited access. For the untrusted link level, the license is issued downstream, but without the symmetric key. Even further, a link back to the previous license holder is included and the previous license holder must approve all transactions before providing a symmetric key directly to the requestor. The ability to support of varying levels of trust is a novel and advantageous feature of the license server.

Figure 3:
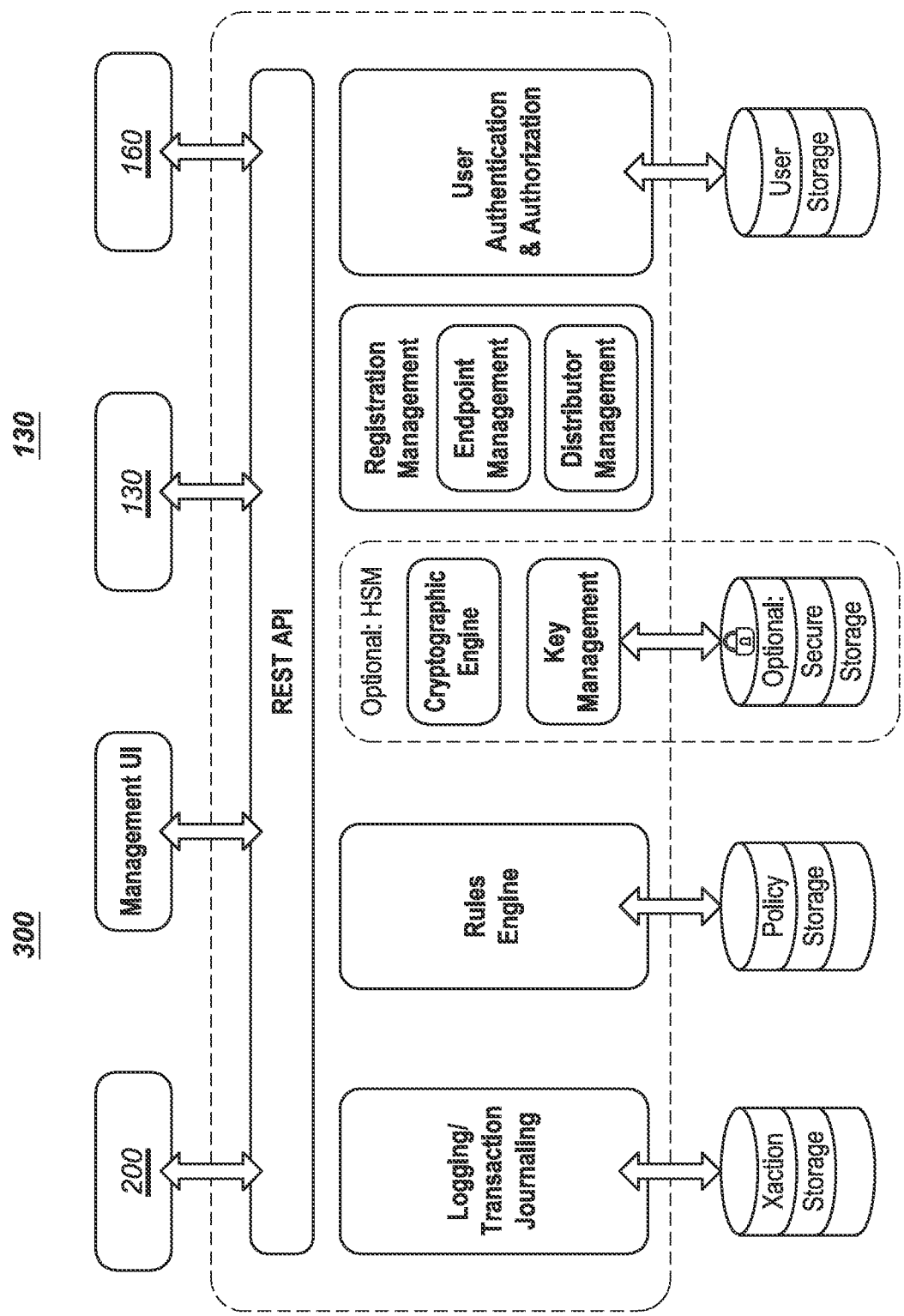
FIG. 3 is an exemplary top-level block diagram illustrating the management license server of the digital manufacturing system of FIG. 1.
Figure 6:
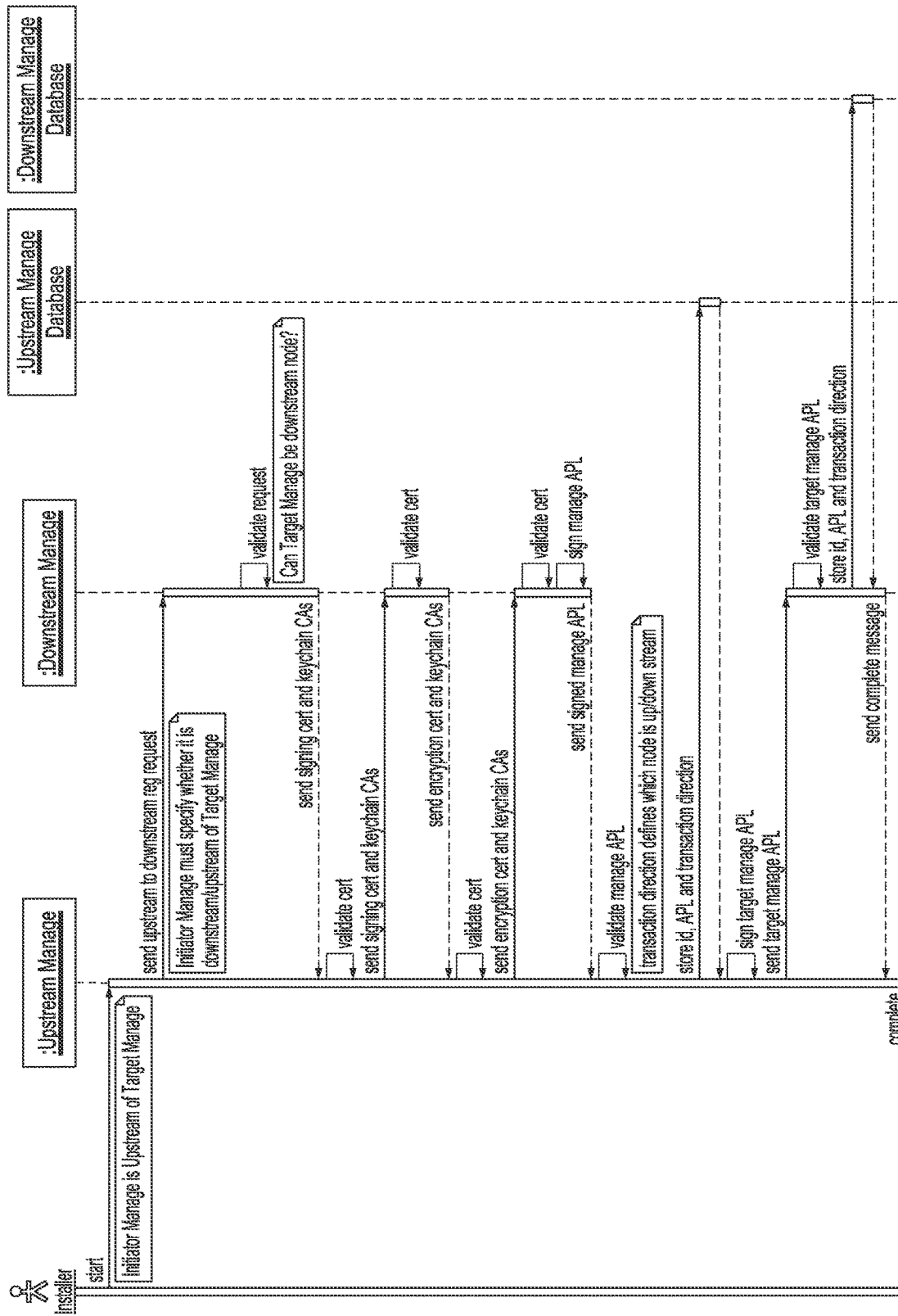
FIG. 6 is an exemplary flow diagram illustrating a downstream registration process for an instance of the management license server shown in FIG. 3.
Figure 7:
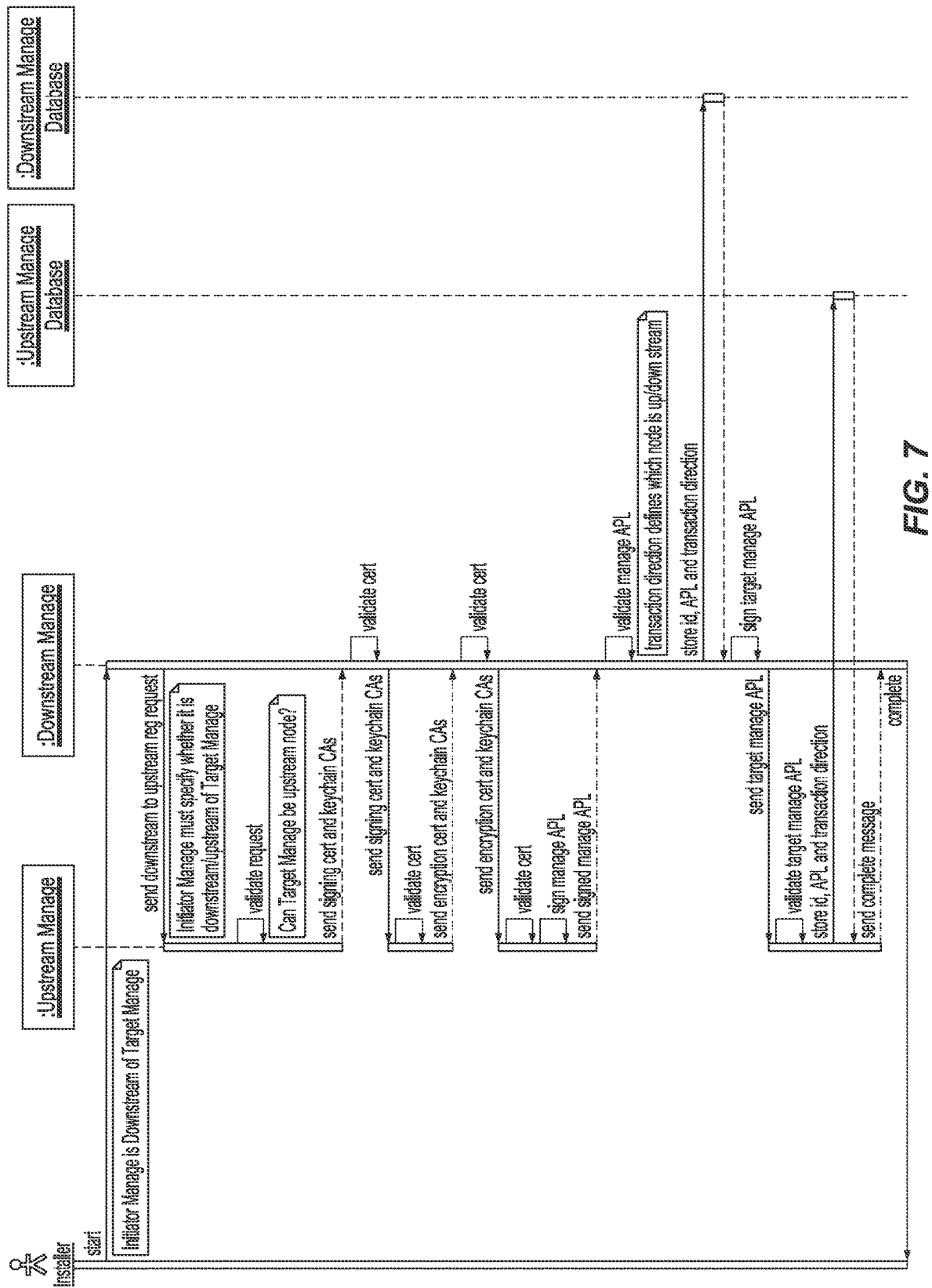
FIG. 7 is an exemplary flow diagram illustrating an upstream registration process for an instance of the management license server shown in FIG. 3.

Turning to FIG. 3, a top-level diagram of the management application 130, such as the management license server 300 is shown. The management license server 300 communicates with the protection component 200, for example, through an application program interface (API). The management license server 300 can register upstream protection applications 110 or instances of manage applications 130, register downstream instances of the management application 130 or the enforcement application 160, receive licenses, update licensing policies, process request to issue licenses, and process requests to re-issue or renew licenses, such as shown in FIGS. 6-7. Although not shown in FIG. 1, multiple instances of the manage application 130 can be advantageous for creating local instances of the management application 130, which can reside closer to the hardware without the need for overcoming network restrictions.

In some embodiments, automatic templates may be setup so that the licensing flow is fully automatic. For example, a user may setup a template such that all designs uploaded to a PLM system are initialized without any control of quantity and no expiration date. When an order is received from an ERP system, the quantity and expiration date can automatically be pulled from the ERP and the DSI can be authorized for production to the supplier defined by the ERP transaction. In this way, the full transaction does not require any approvals. This automated licensing advantageously embeds digital rights management (DRM) directly into the digital manufacturing workflow without requiring an additional application for controlling DRM settings.

In some embodiments, approval flow may be defined so that a manual approval is required for certain transactions. For example, the approval flow could be defined to require that all high value parts must be approved manually before a license is issued for manufacturing to certain suppliers. In this scenario, the management license server 300 sends an approval request to the defined set of approvers before issuing the license to the supplier(s).

In some embodiments, security requirements of downstream systems may be specified as part of the policy. Different security levels may be implemented for downstream instances of the management license server 300 associated with a particular digital manufacturing device and for different instances of the enforce component 400. Accordingly, as part of the policy a user may define which downstream systems are allowed to authorize or produce a DSI based on their implemented security level. Furthermore, the policy language may allow a user to specify which types of private files can be accessed by which type of applications. For instance, a user may specify that a CAD file can be access by a build program, but a build file can only be accessed by an authorized machine.

Advantageously, in some embodiments a user may control revision licensing through the management license server 300. Often, parts produced by a manufacturer will have several revisions or engineering changes (ECs). This can allow for error by the manufacturer in selecting the wrong version or EC of a part. The systems and methods disclosed herein can solve this problem by allowing the IP owner (or distributor) to issue a license for the specific revision or EC required. When producing the part, the enforce component 400 will extract the proper version of the build file from the DSI or reject a wrong version of the DSI according to the license rules.

Figure 4:
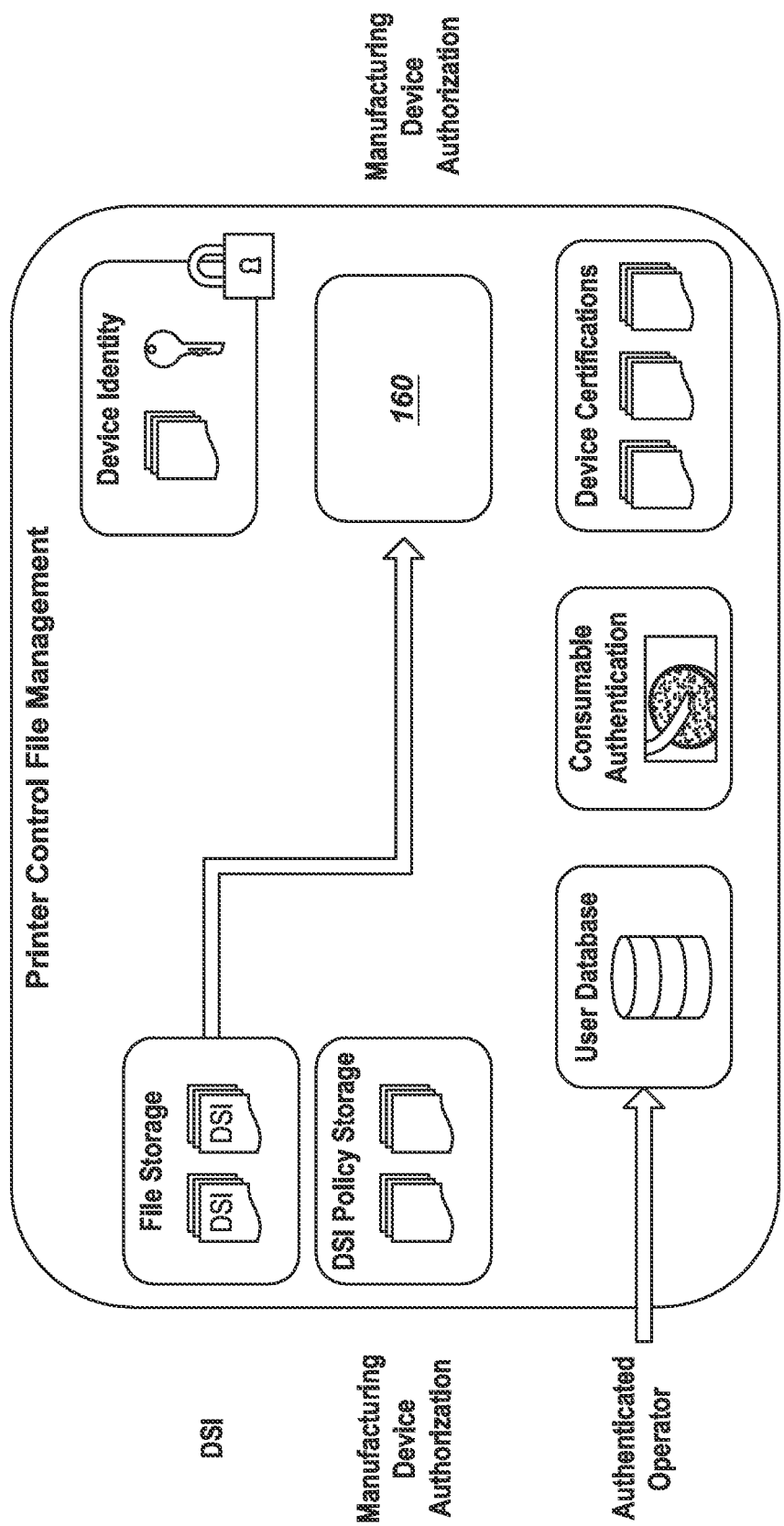
FIG. 4 is an exemplary top-level block diagram illustrating the enforcement component of the digital manufacturing system of FIG. 1.

Upon moving to manufacturing, the enforcement application 160, such as an enforcement component 400 shown in FIG. 4, receives both of the encrypted file 115 and the license from the management license server 300. The enforcement component 400 ensures manufacturing device authorization and adherence to upstream licensing, receives, stores, and enforces device certifications, and initiates and/or updates a supply ledger.

The supply ledger may store all operations and transactions by the applications described herein, with privacy and integrity cryptographically protected. Supply ledger data may be stored in, for example, a centralized database, or in a decentralized system such as a blockchain. An authorized user, for example the owner of intellectual property contained within the ledger data, may specify which data can be accessed by other participants in the ecosystem (for example, distributors and manufacturers). A policy associated with the ledger may specify the type and amount of data collected in the ledge. The ledger may also store identifier codes. These identifier codes may be tags on physical parts with a tracking mechanism, such as a barcode or RFID. The identifier code stored in the ledge may be linked back to the digital file corresponding with the part.

A design creator registers with the system 100 and provides credentials, their design and/or build file(s), and a description into the encryption software. Additional items can also be added such as a reduced quality model for display purposes (i.e., a digital image or degraded design file). Subsequently, the design owner documents licensing rights, such as a number of minimum and maximum units to be produced, and period of production and manufacturing rules (e.g., material, color, type of manufacturing device, layer resolution, use of supports, delegation and transform rights in the policy language of the encryption software). The design creator then encrypts the file(s) and polices creating a digital asset that is then transmitted to a distribution platform.

An authorized user can select the design and a pre-registered manufacturing device. The system will check the licensing and manufacturing requirements of the digital asset against the profile of the user and the settings and capabilities of the selected manufacturing device. If there is a match, the manufacturing of the object is authorized, the file is the transmitted to the manufacturing device along with a certificate that enables only that device to decrypt the device. Finally, an authorized operator can order the manufacture of the device at which point the device will ensure that it is indeed the target of the asset, that an authorized operator is making the request, and that all of the correct manufacturing rules and parameters of the asset are adhered to including, but not limited to: machine manufacturer and/or model, correct consumable loaded, machine tooling parameters, machine inspections and certification up to date, and authorized quantity is not expired. If all checks pass, then digital build file can be decrypted and the production can occur. The data resulting from the production process such as but not limited to number of units, failure rate, duration of the manufacturing process are compiled and securely send back to the creator/owner of the design. If there is no match a message with the reason will be sent to the user.

Accordingly, the digital manufacturing system 100 advantageously provides encryption of digital design/build files with licensing and manufacturing rules, authorization and authentication to manufacture on digital manufacturing devices, selectively transforms files, delegates with or without additional restrictions, and decrypts the design/build files for manufacturing on an authenticated manufacturing device.

Advantageously, the enforce component 400 in some embodiments may have the ability to pull a DSI directly from a repository (such as a PLM/ERP/DAM/DAS system) according to the license received from the management license server 300. In this way the systems and methods disclosed herein may integrate with a manufacturing execution system (IVIES) to receive directions from the IVIES for initiating jobs on a machine. The IVIES would not need to talk to the machine directly and would not need to send files to the machine. An enforce component 400 may manage files on the machine based on the license from the management license server 300 according to instructions from the MES.

Build files are large files; accordingly, in some embodiments the enforce component depicted in FIG. 4 may feed small segments of the build file to the digital manufacturing device rather than providing the full file. The segmented build file approach allows the decrypted file to never be fully contained on the disk and only decrypted within memory buffers. Advantageously, this enables the file to be segmented and buffered from a secure application directly embedded in the machine without the need for a hardware protected file storage system. It is feasible to segment the file into buffer sections that are encrypted with different keys.

The decryption keys could be delivered to the machine as needed along with the buffer segments. Note that this embodiment would require an online connection between the machine and the dedicated manage component (depicted in FIG. 3) for the digital manufacturing device.

Figure 5:
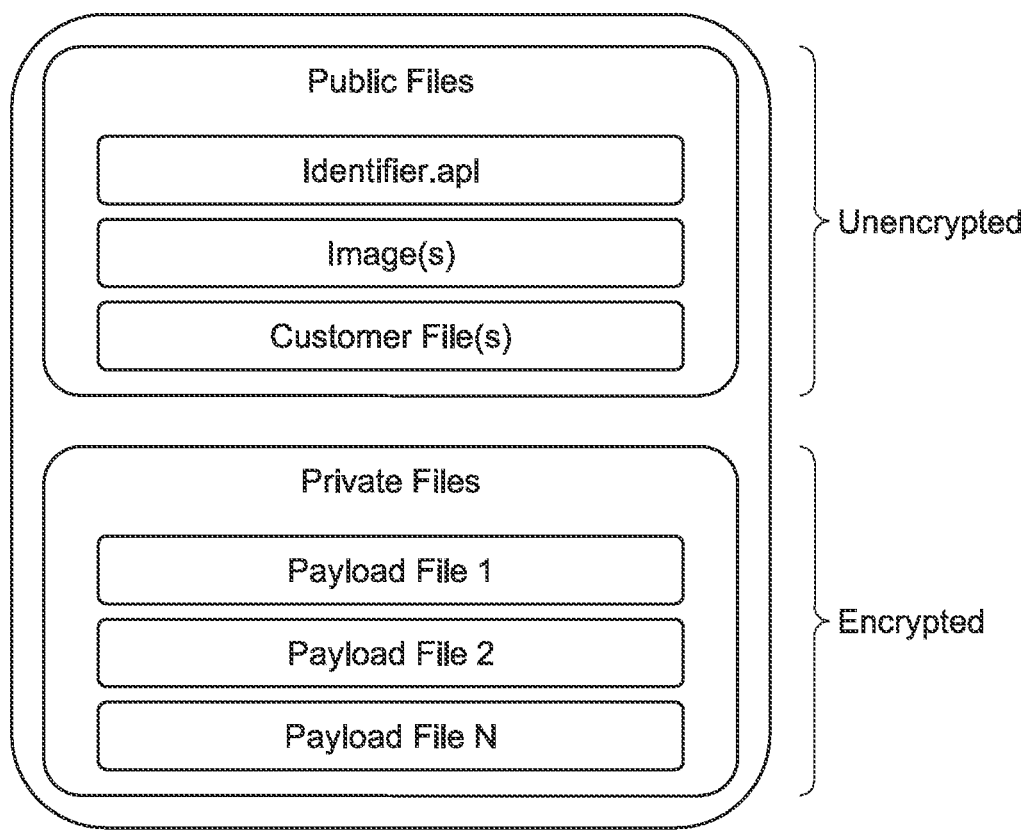
FIG. 5 is an exemplary block diagram illustrating an embodiment of a digital supply item that is used with the digital manufacturing system of FIG. 1.

With reference now to FIG. 5, an exemplary encrypted file 115, such as a digital supply item (DSI) 500, which can be created using the digital manufacturing system 100 is shown. The digital supply item 500 is a digital container that includes the information required for the production of a digital asset within the digital manufacturing system 100. In some embodiments, the DSI 500 is a single file for securing private data for transport to the digital manufacturing device. Within the system disclosed in FIGS. 1-4, the DSI 500 may be created by the protection component 200 illustrated in FIG. 2, while the enforcement component illustrated in FIG. 4 may decrypt the contents of the DSI and provide appropriate build files to the digital manufacturing device. Access controls and rights to the DSI may be governed by the management component illustrated in FIG. 3. The separation of the DSI 500 from the authorization APL 116 is an advantage in that the DSI 500 can be stored and handled without any special security considerations and allows for less expensive cybersecurity protections around the large data sets, while the authorization APL 116 can be highly protected by the management application 130. This separation of the DSI 500 and authorization APL 116 also allows for much easier integration with common digital manufacturing workflow applications, as compared to systems that require the protected files to be stored in special secure hardware, which is more expensive and difficult to integrate into the workflow.

As shown in FIG. 5, the digital supply item 500 includes an encrypted section for all confidential information and an unencrypted portion for any non-confidential information. In some embodiments, the digital supply item 500 can be compressed and/or uncompressed. An advantageous feature of digital supply item 500 is the ability to include both an encrypted section and an unencrypted section that allows any number of files in each section. Additionally, any application in the digital manufacturing workflow can read any public file from the container without restrictions. This allows for an easy method of transferring files between each application. Moreover, even though the public files are not encrypted, the integrity of each file is protected with cryptographic digital signatures.

The unencrypted portion of the digital supply item 500 can be used for identification of a design and include one or more data fields that are organized, for example, as an extensible markup language (XML) file. The one or more data fields of the unencrypted portion can include a version field, a unique ID field, a design name field, a user name field, a date created field, a public key field, a company name field, a key role field, a custom ID field, a description field, a multi-platen field, an image field, and so on. Any identifying or revision parameters, such as IDs or version numbering, can be stored in the digital supply item 500 by the PLM/ERP/DAM/DAS system and used by the workflow application to manage access of the proper data revision. Additionally, the digital supply item 500 can be licensed such that only the correct revision can be accessed by the machine manufacturing the device, advantageously preventing the manufacture of the incorrect part revision.

The encrypted portion of the digital supply item 500 can include one or more encrypted files. In some embodiments, each file can be encrypted separately with unique keys and initialization vectors (IVs). Each encrypted file of the digital supply item 500 can be identified by a file information block (FIB) that includes an unencrypted parameter that identifies the file number of the encrypted file. The FIB can be used to decrypt and recreate the encrypted file in the original format. Parameters for the FIB can include, for example, a key (used to encrypt the file), an IV, a hash digest, a file number, a compression method, an uncompressed size, a file name, and so on. For example, a selected payload file shown in FIG. 5 can include an identifier file, an image file, a schematic file, and one or more encrypted CAD drawings. An advantage of the architecture of the digital supply item 500 is that individual files may be either encrypted or not encrypted with the ability to define what applications and/or machines can access those files based on the individual file or the file time.

As one example, a DSI 500 could be named part.dsi. Part.dsi is an uncompressed ZIP archive with a.dsi extension that may store both encrypted and unencrypted files. Part.dsi would show the following files in a zip archive: Identifier.ap1 (an XML based Authorized Policy List or APL file); Part1.jpg (an image file); Schematic.pdf (a customer file); E1:ecad; and E2:ecad (the latter two being encrypted data files). In this exemplary embodiment, Identifier.ap1 contains all non-private identification information necessary to describe the DSI to Digital Asset Managers (DAM) including PLM and ERP systems as well as identify the DSI to the management license server 300 depicted in FIG. 3. The management license server 300 may provide the DSI FIB for E2:ecad. The enforcement component depicted in FIG. 2 may then decrypt decrypt E2:ecad into part.job file.

As another example, a DSI 500 could be named E47892.dsi. E47892.dsi is an uncompressed ZIP archive with a .dsi extension that may store both encrypted and unencrypted files. Part.dsi would show the following files in a zip archive: Identifier.ap1 (an XML based Authorized Policy List or APL file); image.jpg (an image file); E1:ecad; E2:ecad; and E3:ecad (the latter three being encrypted data files). In this exemplary embodiment, Identifier.ap1 contains all non-private identification information necessary to describe the DSI to Digital Asset Managers (DAM) including PLM and ERP systems as well as identify the DSI to the management license server 300 depicted in FIG. 3. The management license server 300 may provide the DSI FIB for E1:ecad, E2:ecad, and E3:ecad. The enforcement component depicted in FIG. 2 may then decrypt decrypt E1:ecad, E2:ecad, and E3:ecad into E47892.sli, support.sli and E47892.job files, respectively.

In some embodiments, a digital manufacturing device such as an additive manufacturing device may build multiple physical parts on a single build plate. In some embodiments, parts being built on a single build plate may have separate characteristics such as separate licensing policies. To support this use case, a special DSI may be defined that may support machine original equipment manufacturers ("OEMs") that allow this case without flattening the part information into a single build file. It will be assumed that each part may have a unique DSI and APL, both of which may be created using the standard DSI and APL specifications. A new DSI may be created for the entire build plate. The individual parts files may be stored as DSI files in the public file section. The build file that contains orientation and placement information on the individual parts on the build plate may be stored as a private file. The Multi-Platen field discussed above may be set to an appropriate value to indicate this situation, e.g., the field could be a binary filed. An image may be supported in the same way as a standard DSI. Advantageously, the digital manufacturing device of the embodiments described above can thus build multiple physical parts with different DRM characteristics on s single build plate.

As an example of these embodiments, a DSI 500 could be named plate1.dsi. Plate1.dsi could contain the following files: identifier.ap1; image.jpg; part1.dsi; part2.dsi; turbine.dsi (the three preceding files containing information for individual parts on a build plate); and E1:ecad (which contains a file plate.job which describes the part orientation on the build plate). Authorization APLs for part1.dsi, part2.dsi, turbine.dsi and plate1.dsi are received, and verified to be authentic and to have a policy that allows production, by the enforce component shown in FIG. 4, and in turn the enforce component authorizes the build.

As the preceding description makes apparent to one of ordinary skill in the art, these multiple platen build embodiments improve the efficiency of an additive manufacturing process and are technical improvements to additive manufacturing machines, by providing heretofore unknown capabilities for the machines to build multiple parts at once, and thereby increate throughput, while at the same time maintaining part-specific protection of the digital design files.

The entire encrypted portion and the corresponding FIB can be encrypted, for example, with an RSA encryption key of an authorized receiver. The encrypted portion can also be hashed using a hash table such that the hash digest will be stored in the corresponding FIB. Prior to decrypting any of the encrypted portion, the hash digest can be verified with the contents of the FIB. Although described with RSA and hash encryption, any suitable cryptography can be used herein, such as secure hash (including secure hash algorithms (SHA), SHA-1, SHA-2, SHA-3, and so on), RSA key pairs, Advanced Encryption Standard (AES) keys, IV generation, file padding, and so on.

Multiple benefits may be realized from using a DSI container such as the one described herein and depicted in FIG. 5 as DSI 500. A DSI 500 may protect any number of private (encrypted) and public files normally used in the digital workflow. Any PLM/ERP/DAM/DAS within the workflow may read public identifying information and public files from the DSI container. Any identifying or revision parameters, such as IDs, S/Ns or version numbering may be stored in the DSI container by the PLM/ERP/DAM/DAS. Advantageously, each private file may be encrypted with a unique symmetric key. The management license server 300 depicted in FIG. 3 may issue licenses (APLs) that will enable the enforcement component depicted in FIG. 4 to decrypt and provide access control to any private file within the DSI container.

In one embodiment, a DSI container could provide both CAD files that were used to create a part and build files that contain machine specific directions on how to manufacture the part. The management license server 300 depicted in FIG. 3 may then allow build programs that use CAD files as import to create build files for additional machines and store the encrypted build files back in the DSI container. The management license server 300 depicted in FIG. 3 may then, for instance, assign the enforcement component depicted in FIG. 4 on a first machine created by a first type of manufacturer to have access only to a first type of build files compatible with that first machine, while also assigning the enforcement component in FIG. 4 on a second machine created by a second type of manufacturer to have access only to a second type of build files compatible with that second machine. In this way, a manufacturing site with multiple machines could utilize a single DSI file to build parts on any machine type. The management license server 300 depicted in FIG. 3 may direct the specific machine to have access only to the build files required of that machine. Advantageously, DSI 500 may have the capability to store multiple protected files and the management license server 300 can direct specific files to only applications and hardware devices (for example, additive manufacturing machines) that are allowed to have access to those files, with the latter providing a particularly advantageous feature. Advantageously, access to files can be controlled by the file type as well as by the specific file. For example, CAD files can only be accessible by CAD applications and build files can be accessible be machines.

Furthermore, as previously mentioned, tracking the provenance of each part throughout the supply chain is very difficult if not impossible when the subcontractors use different data collection methods that are often proprietary and are physically spread across the globe. A distributed ledger advantageously replaces centralized and proprietary databases with a decentralized open data repository. For example, within a blockchain, each node participating has the opportunity to add to the ongoing and constantly updated shared ledger. The shared ledger has strong cryptographic integrity protection which preserves the entire recorded history of transactions within a given blockchain. Additionally, each node can vote on the authenticity of any transaction and reject those transactions which are fraudulent. The decentralized nature of the blockchain means that no single company will have ownership or undue influence on the data recorded in the ledger.

Accordingly, in some embodiments, each of the applications of the digital manufacturing system 100 is executed on independent nodes and can be integrated within a distributed ledger, such as a supply chain blockchain. The blockchain is used to store all recorders of a created part and associated transactions.

Each block in the chain outputs the hash of all the transaction records recorded since the previous block was issued along with the hash of the previous block. In this way, this output is a function of all transactions of the digital manufacturing system 100. In some embodiments, the transactions are broadcast globally through a peer-to-peer network, thereby allowing all participants in the digital manufacturing system 100 to observe all transactions presently and in the past. For instance, a subcontractor could report on each part added to an assembly and record the transaction when the subassembly is sold to another contractor in the supply chain. The receiving contractor would then report on the receipt of the subassembly and provide records of operations and transactions associated with the subassembly. Therefore, the final assembly should have a full and open record of the creation of all parts within that assembly.

A cryptographic work function can be required for the creation of each block to prevent the forking of the blockchain by an attacker, who is motivated, for example, to create double transactions. In some embodiments, the cryptographic work function includes a mathematical problem to be solved that receives the previous block as input and uses a cryptographic strong hash function to generate a hash of the mathematical problem. Advantageously, the cryptographic work function then prevents an attacker from creating forked blocks faster than distributed miners can create main blocks of the blockchain.

The digital manufacturing system 100 can be implemented within a distributed ledger in any suitable manner, depending on the specific computing platform. For example, for a blockchain-based distributed computing platform featuring smart contract scripting functionality (e.g., Ethereum), the authorization APL created by the digital manufacturing system 100 is stored in the blockchain and the digital contract is used for licensing. For simpler implementations as described below, a digitally signed hash record of the authorization APL is stored on the blockchain. In either case, a record of the license transaction is preserved by the blockchain. If the entire license is embedded in the blockchain, then the blockchain itself serves as the transportation mechanism for transporting each license between nodes. Any confidential information in the authorization APL is encrypted with the licensee cryptographic key (e.g., the encryption key of the selected protection application 110, management application 130, and so on), so that the integrity of the transaction is be preserved while retaining the confidential portion of the authorization APL.

In some embodiments, the digital manufacturing system 100 enhances the supply chain blockchain by adding records of a digital twin to each physical part created with digital manufacturing technology. As used herein, the digital twin describes the digital representation of a physical part. When a digital supply chain tracking is married with a physical supply chain tracking, the digital twin refers to the digital files that represent the physical part. This allows the final assembled product to have a complete record of the manufacturing operations as well as the digital design and the encrypted file 115 included in the completed product.

In one embodiment, a receipt of each transaction is stored to the distributed ledger, such as a blockchain. Each new authorization APL created by a selected application (e.g., the protection application 110, management application 130, and so on) will store the hash of the authorization APL and a unique identifier for the authorization APL to the blockchain. When a downstream application receives the authorization APL, the application can verify the authenticity of the authorization APL by reading the hash of the authorization APL stored on the blockchain. Additionally and/or alternatively, the sending and receiving can be stored as data elements of the authorization APL. For example, the parameter that describes the manufacturing machine that is allowed to produce the part can be stored directly on the blockchain as a parameter.

In another embodiment, the full license information can be stored on the distributed ledger, an advantageous capability not present in known systems. For example, the entire plaintext of the authorization APL is stored on the blockchain in the standard format. The blockchain provides permanent storage, authenticity, and transportation of the license information. However, the blockchain need not perform any operations based on information contained in the authorization APL. All applications that receive an authorization APL continuously monitors the blockchain for a new authorization APL. When an Authorization (e.g., the authorization APL 116 that is targeted for a specific application in the digital manufacturing system 100) licensed for the monitoring application is identified, the application will download the selected authorization APL and perform the operations specified by the authorization APL. Additionally and/or alternatively, the sending and receiving can be stored as data elements of the authorization APL.

In another embodiment, the quantity authorized can be stored on the distributed ledger. When the authorization APL is issued, the total quantity authorized is initialized and stored as a parameter in the blockchain. The total quantity available will be a public parameter along with a unique identifier for the part. The current licensee of the part is designated as a parameter in the blockchain. The current licensee can transfer ownership of a number of parts to a blockchain account as long as the amount of quantity transferred is less than or equal to the amount specified in the blockchain. The amount of quantity stored in the blockchain under the current owner's account is decremented to reflect the amount transferred. The new owner then receives an authorization APL stored with the quantity transferred. Therefore, there can be multiple owners of a part specified on the blockchain. When the licensee receiving the quantity of parts is a manufacturing machine and the machine produces a physical parts, the amount of quantity stored on the blockchain is decremented by the amount of physical parts produced.

In another embodiment, any of the license or manufacturing parameters stored in the authorization APL can be stored as parameters in the blockchain. When a quantity of parts is transferred to a new licensee, any of the license or manufacturing parameters can be modified by the current owner. The new owner will then have the authorization APL embedded in the blockchain with the number of parts transferred by the previous owner and license and manufacturing parameters as specified by the previous owner.

Confidentiality protections and key distribution network within a blockchain can also be handled in any manner described herein. For example, in one embodiment, any parameter of the authorization APL that is confidential can be encrypted. The encryption is performed with the licensee's public key so that only the licensee can decrypt the parameter using their private key. The confidential information is unavailable on the blockchain, but the licensee can view the parameter after performing decryption.

In another embodiment, the blockchain distributes cryptographic keys. The cryptographic keys used to encrypt files within the encrypted file 115 can be encrypted with the licensee's public key so that only the licensee can decrypt the cryptographic keys using their private key. In this way, the current owner can identify which specific files or file types the licensee will have access to by only providing the cryptographic keys to those specific files or file types to the licensee.

Transactions can also be reported within a blockchain in any manner described herein. As an example, each transaction performed within the digital manufacturing system 100 is reported to the blockchain. A report is generated each time a transaction is processed by an application within the digital manufacturing system 100. The full details of the report are stored on the blockchain, by the node running the selected application.

In another embodiment, a receipt of each transaction within the digital manufacturing system 100 is reported to the blockchain. A report is generated each time a transaction is processed by a selected application within the digital manufacturing system 100. Only the hash of the report is stored on the blockchain, by the node running the selected application. The report details are transmitted to other parties through a channel outside of the blockchain. The receiver of the report can hash the report and confirm the hash stored on the blockchain to authenticate the report.

In another embodiment, each transaction performed within the digital manufacturing system 100 is encrypted and reported to the blockchain. A report is generated each time a transaction is processed by a selected application within the digital manufacturing system 100. The report is encrypted using symmetric encryption keys. The symmetric encryption keys will be encrypted with the receiver's public asymmetric key. The receiver's public keys can be associated with accounts on the blockchain. Additionally and/or alternatively, the receiver's public keys can be public keys held outside the blockchain. The encrypted report is stored on the blockchain, by the node running the selected application.

Figure 8:
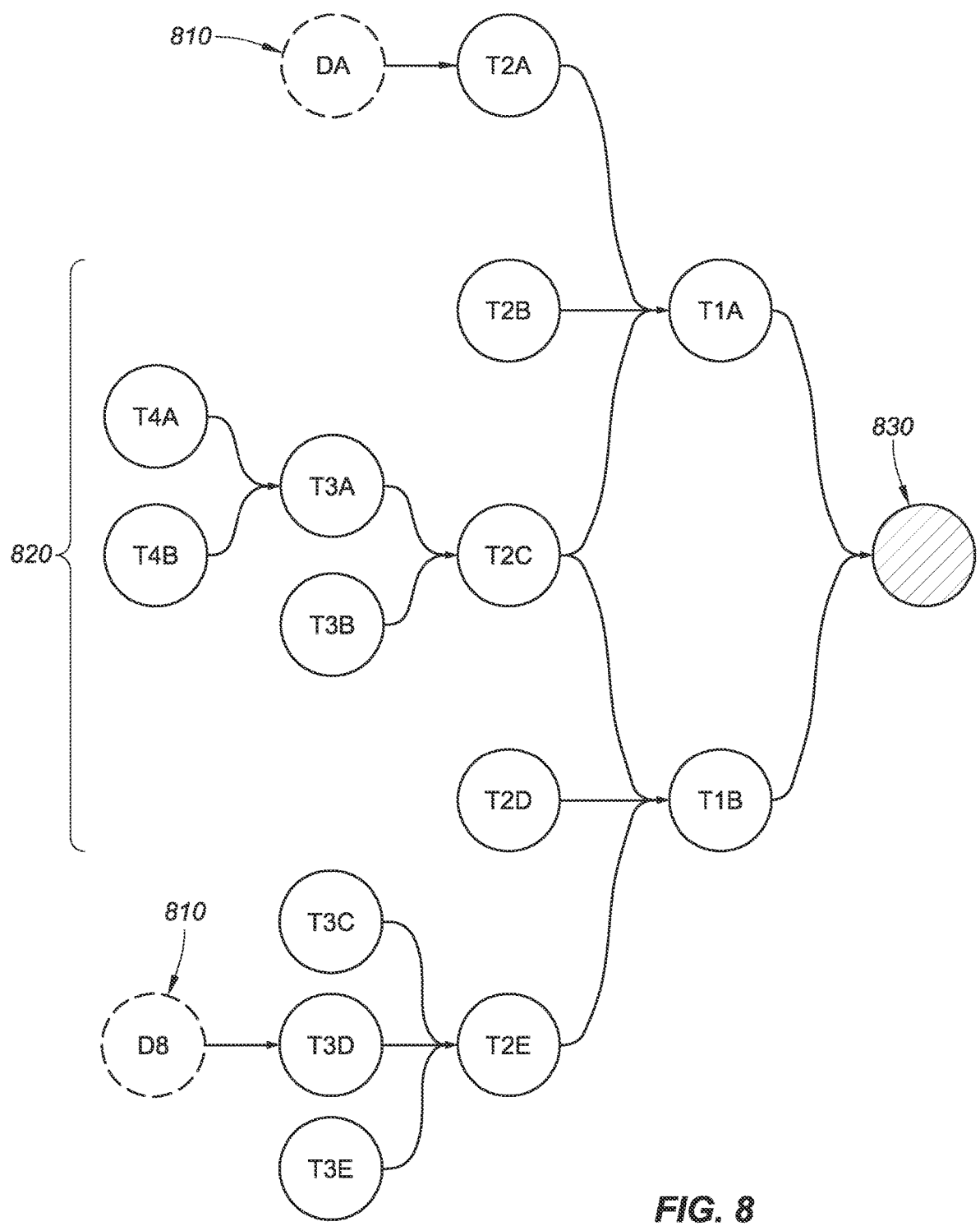
FIG. 8 is an exemplary top-level diagram illustrating a supply chain that can be used with the digital manufacturing system of FIG. 1.

Turning to FIG. 8, an exemplary supply chain that can be used with the digital manufacturing system 100 is shown. Subcontractors 820 manufacture subcomponents and/or provide raw materials to be used in a final product that is shipped to customers 830. Subcontractors 820 that ship directly to an integrator that creates the final product (not shown) are considered Tier 1. Subcontractors 820 that ship to the Tier 1 subcontractors 820 are considered Tier 2. Digital supply chains 810 are protected by the digital manufacturing system 100.

Within each subcontractor 820, there are a multitude of manufacturing operations where subcomponents are assembled or created. Each operation on a part is tracked as defined by the product specification of the digital manufacturing system 100 described herein. Certain operations that are considered highly confidential to a selected subcontractor 820 need to be protected from outside visibility. However, for this example, it is assumed that each operation is tracked in the ledger as a transaction.

In some embodiments, anyone can register and participate in the blockchain and receive the full transaction record. In a preferred embodiment, one approved vendors/suppliers can participate in the transaction ledgers, thereby allowing a certificate authority to certify each vendor and potentially each manufacturing machine within the ecosystem of the supply chain. The supply chain ecosystem preferably includes all subcontractors 820 of the final integrator who ship parts to the customer 830.

In the supply chain shown in FIG. 8, the following transactions are defined for exemplary purposes only:

Transfer: The ownership of a component is transferred from one subcontractor 820 to another. This occurs when a part is transported to the custody of another entity. The ownership transference could occur between machines within a manufacturing line.

Transformation: The part is physically transformed in a means by a manufacturing device. This could be a mechanical operation where the part is physically modified or an electrical operation where the part is programmed with electronic data.

Integration: In this operation, multiple parts are combined together to form a new device.

When any of these transactions are performed, the device performing these transactions broadcasts the transaction details to all participants. Each transaction is cryptographically signed by the device performing the transaction. Since each device must be certified, the receiver verifies the integrity of the public key of the device sending the transaction information. Thereby, only certified devices can broadcast transactions.

Figure 9:
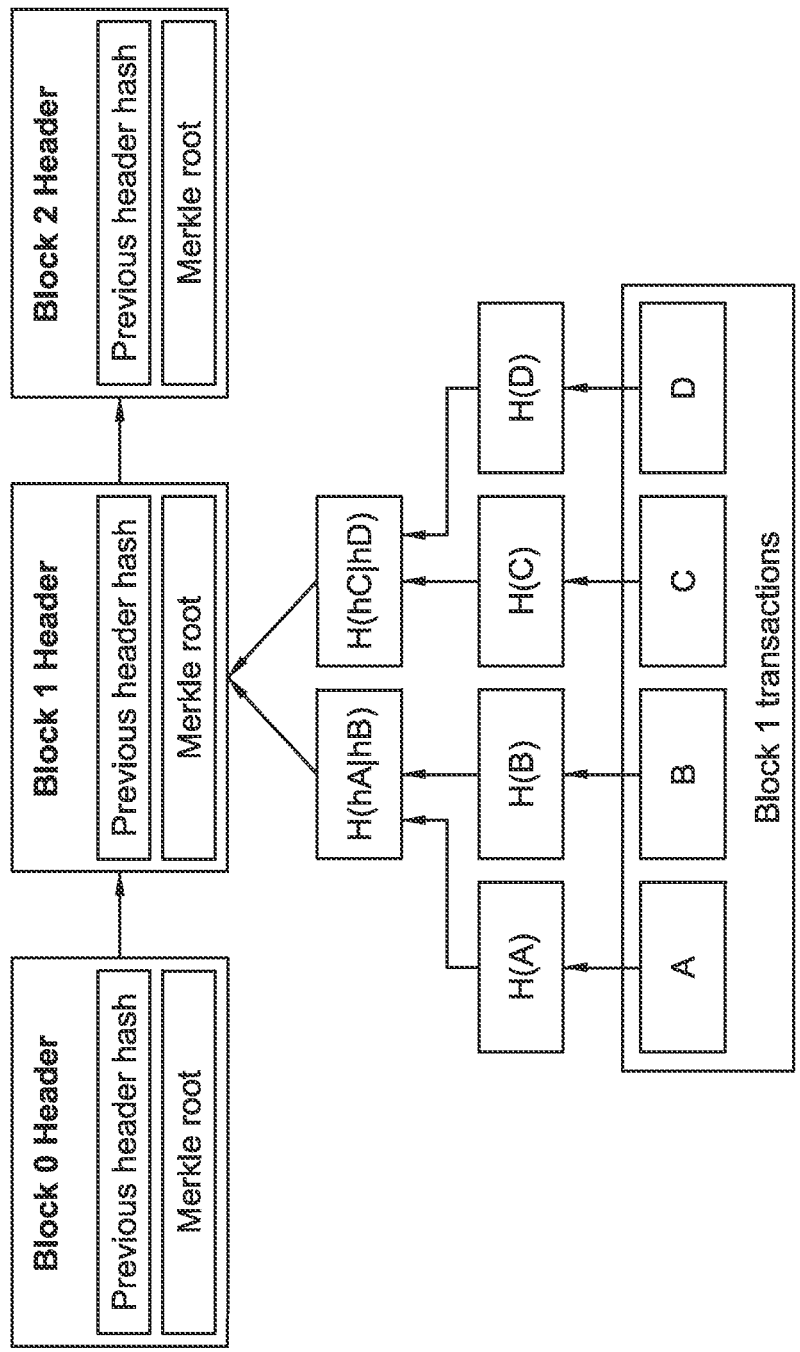
FIG. 9 is an exemplary block diagram illustrating a hash tree that can be used to integrate the supply chain of FIG. 8 with a distributed ledger.

Since transactions may be considered confidential, the device can protect the information in any manner. For example, as each block creates an output hash to send to the new block in the chain, this hash is created from a Merkle tree hash of all transactions, such as shown in FIG. 9. The transaction details are not required to create the block, only the hash of the transaction. To protect the details of the transaction, the device broadcasts the hash of the transaction to the network. Additionally and/or alternatively, the device encrypts the transaction and broadcasts the encrypted blob of data. Each node in the network then hashes the encrypted blob in order to create the Merkle tree shown in FIG. 9. Using the manage application 130, the keys to decrypt the transaction information are provided to trusted users of the data.

The table below illustrates an exemplary four transactions per block. The first two transactions are in plain text, while the last two are encrypted. All parties with access to the ledger can verify the Merkle tree and, therefore, the blockchain, but only parties with the cryptographic key can decrypt the contents of the hidden transactions.

| Transaction | Transaction Hash | Transaction branch Hash | Merkle Root Hash | Block Hash |
|---|---|---|---|---|
| Transform 324 . . . | F34D87C . . . | 7DF8791 . . . | 783F7AB . . . | F7893641 . . . |
| Transfer 3489 . . . | 1C889EA . . . | | | |
| asdfhipfdhfas . . . | 7F79C7D . . . | FD34FC . . . | | |
| dpoiafsdndl . . . | D79C78B . . . | | | |

In an alternative embodiment, to provide privacy, an entity stores all transactions on a part within their process and all previous operations from upstream entities on a ledger. Then, when that part is physically sent to a downstream party in the supply chain, the entity will encrypt that ledger information with the downstream party's public key (which is used for identification in the blockchain). The entity would publish the encrypted transactions (ledger) on the blockchain and the hash of the encrypted data would be used to build the hash tree. Then the downstream party would be able to decrypt the ledger and create a new ledger which includes their operations on the part, then when they ship the part downstream they would encrypt the ledger to the next downstream party. The final assembly and ship entity would have access to the entire history of the component, but parallel parties (competitors) would only be able to access the encrypted data. However, a public record of the history of the transactions would be available to everyone and allow audit trails. This method advantageously encrypts parameters within the blockchain and enabling key distribution to trusted nodes through blockchain transactions.

For example, with reference again to FIG. 8, when subcontractor T4A creates a device, there will be a digital ledger based from the digital supply chain of DB. When T4A ships the final assembled part to T3A, the output ledger will contain all of the ledger information in DB and T4A. This ledger information is encrypted with T3A's public key, and on the blockchain, a transaction is added from T4A to T3A, but the ledger details will be stored in encrypted form on the ledger. As T3A transforms their product, they will add ledger details about the operations. Then when they ship the final assembled part to T2C, all subcomponents from DB, T4A and T4B will be decrypted by T2C, added to the ledger and then encrypted with T2C's public key. A transaction will be added to the blockchain for this transaction and again the details will be stored in encrypted form. This process will continue all the way to the final assembly. The final integrator 830 should have a full ledger for the complete provenance of all subcomponents that only the final integrator 830 has access to decrypt.

Further embodiments of the inventions disclosed herein allow for the ability to enable and control multiple digital workflow processes required to produce a physical part. In advanced manufacturing workflows there are often multiple processing steps involved in the manufacturing of a part. These workflow processing steps may be implemented by software or hardware and may require multiple digital manufacturing devices. As further described in the paragraphs which follow, embodiments of the invention address these situations via systems and methods that allow an engineer to specify all digital workflow processes required for manufacturing from the state of the current digital workflow files stored in a digital supply item (such as digital supply item 500). These systems provide assurance that each workflow process is completed according to the licensing policy. Additionally, both the confidentiality and integrity of the data flowing between workflow processes is protected by the digital supply item's secure container.

In digital manufacturing there are often multiple digital workflow processes required to prepare the files that are consumed by a manufacturing device. For example, in certain types of additive manufacturing digital workflows the geometry of a three-dimensional part will be created using a CAD software program. That 3D geometric representation will then be converted into a STL file with only information regarding the surface geometry retained. Then the STL is converted into the separate layers that will be processed by the manufacturing device and device specific code required to produce those layers is created. At this point, a build file has been created that supports a particular model of a manufacturing device. In some cases, further conversion is required if a particular manufacturing device has special calibration settings that have to be included in the build file. Additionally, if multiple parts are produced at the same time on a single build plate, then another conversion is required to produce a build file including all parts. Other digital manufacturing processes will require a different process, but in most cases, multiple distinct processing steps will be required to produce a build file. Additionally, the exact processing required may not be known at the time of the creation of the geometry files.

In addition to processing steps required prior to production at the manufacturing device, there may be post-processing steps required using additional physical machines. For instance, in certain types of workflows used in the manufacture of metal objects by additive manufacturing, the parts must be cut from the build plate. For some metal additive manufacturing processes, there is a heat stage that is required to create certain material properties. Additionally, physical machining may be required to produce the appropriate surface finish required for the end part.

Depending on the specific use case as well as the capabilities of the part designer, a designer may have to perform different levels of build file preparation. For instance, the part designer may not have access to the build file preparation software used for certain machines. Therefore, the design owner may require the manufacturer to perform several digital workflow processing steps prior to the part being produced by a machine. However, the design owner wants assurance that the confidentiality and integrity of the part is maintained through the pre-production digital processing steps.

To enable protection of confidentiality and integrity across all digital workflow processes, embodiments of the inventions disclosed herein may extend the previously described policy language in the Authorization APL (such as Authorization APL 116) to include multiple digital workflow processes required to product a physical part. A new workflow process section is added to the Authorization APL in which each workflow process can be defined. The definition may include allowed inputs, the required user, the allowed outputs, the settings allowed, the features that can be used, the device in which the process is operating and details of process steps allowed.

The inputs to a workflow process may be a set of unprotected files or may be stored in a digital supply item. If the input is stored in a digital supply item, then the specific encrypted files that must be extracted will be defined and the Authorization APL will include the DSI keys for those files wrapped with the key of the workflow process. There will be a parameter in the Authorization APL that defines where workflow process must look for the input files.

The outputs of a workflow process may include workflow files required by a downstream process, log files used for analysis of the process or ledger files that record the steps performed by the process. These output files may be a set of unprotected files or may be confidential files that should be stored in a digital supply item. If the output files are to be stored in a digital supply item, then there will be an Authorization APL created for that DSI. An Authorization APL parameter is created that defines where the output files, or DSI container, should be stored.

The allowed user(s) of the workflow process is defined as either a pre-defined user or set of users, a class of user, a certified user or no restrictions on the user. The workflow process may be defined as a software application running on a client PC, a server, or special hardware, a hardware device with embedded software running on the device or a hardware device with process controls executing entirely in hardware. Any controllable setting or feature of the workflow process will be defined in the Authorization APL. These settings may include static settings that will remain the same for the entire process, or even dynamic settings that may change with processing steps. The exact sub-processing steps within a software or hardware application can be defined, including any settings required for each sub-processing step.

The implementation of the workflow process, whether software or hardware based, must be executed within a trusted environment. There are many possible embodiments for securing the workflow processes. A few possible embodiments will be described herein.

In one embodiment, the workflow process will be implemented on a hardware device with embedded software applications and an embedded software operating system. The hardware device may be a manufacturing device that performs a physical operation, a server that hosts software applications or a stand-alone computer. A secure enclave will be created within the embedded system of the hardware device. A secure enclave may be implemented within a compute core using, as an example, Intel Software Guard Extensions (SGX) or ARM Trust Zone. Outside of the compute core, a secure enclave may be implemented using a smart card, secure element or Hardware Security Module (HSM). Additionally, the secure enclave may be implemented by security hardening a PC by restricting interfaces and operation access through the operating system. In that enclave, a workflow management application will execute to enforce the defined workflow process based on the restrictions of the Authorization APL. This application will take in defined inputs, which may require decryption and extraction of files from the digital supply item and pass those inputs to the workflow process. The workflow process will then be directed to take the processing steps and enforce the settings defined by the Authorization APL. Once the workflow process is complete, any output files generated will be handled according to the requirements of the Authorization APL.

In another embodiment, there may be multiple workflow processes implemented on a single hardware device with embedded software applications and an embedded software operating system. As with the previous embodiment, the workflow processes will be controlled from a secure enclave. The input and output operations will work the same as the previous embodiment, but instead of controlling a single software or hardware process, there will be multiple processes to control. The output of one process may be applied as input to the next process in the workflow as defined by the Authorization APL.

In one embodiment, multiple workflow processes execute within a security boundary with an enforcement application (such as enforcement application 160) instance implemented for each workflow processes. The security boundary may be a secure enclave within a single electronic device, or a collection of discrete processes running on different systems, but implemented within a physically secure boundary such that there is no risk of loss of data or attacks on the integrity of the data within the security boundary. To control the data flow and process steps, a workflow manager application is used to control each workflow process and the dataflow between components. The process steps defined by the Authorization APL will be utilized by the workflow manager to enforce all workflow processing as desired by the user. In this embodiment, each workflow process has a unique enforcement application instance used to enforce the security requirements for that workflow process. However, in another embodiment a single enforcement application instance is used to enforce the security of multiple workflow processes. Ultimately any workflow process can be assigned an instance of enforcement application, but there must be at least one instance of enforcement application within the security boundary. When the final workflow process within the security boundary completes, the protection application (such as protection application 110) will be used to create a secure container for the storage and transport of any output files from the workflow process. These output files may be used by other workflow processes or may contain data generated by the workflow processes that can be used for analysis and confirmation of the process steps.

In other embodiments, multiple workflow processes may exist each within separate security boundaries. Within each security process there must be an instance of enforcement application 160 used to verify the Authorization APL, extract and decrypt private files, enforce the parameters of the Authorization APL and control the processing steps of the workflow process. Additionally, the output files generated by the workflow process must be protected in a secure container using the protection application. The output digital supply item from the security boundary can either be stored in a DAS, with no security requirements, or be sent to the next workflow processing step. The Authorization APL generated by the protection application will be imported to a management application (such as management application 130), then management application will issue a new Authorization APL for the next processing step. Management application will control the workflow by issuing an Authorization APL for the next workflow process only when the previous workflow process has completed successfully. Additionally, the location of the DSI container for the next workflow process will be included in the Authorization APL.

Advantageously, these embodiments provide a digital rights management solution that can provide multiple applications/operations to be performed in sequence, and furthermore, do so with the ability to encrypt information between the sequential applications/operations.

In addition to workflow process steps involved in the manufacturing of a part, the embodiments disclosed herein apply to quality control process steps as well. To fully enable the benefits of digital manufacturing, the quality control process must be secured so that a customer can be assured the end part conforms to the exact product requirements without leaking confidential information. Even in today's most advanced digital manufacturing systems, human operators are tasked with determining part quality and adherence to the process standards specified by the customer. This dependence on human operators can allow for variation in the reproducibility of quality control standards as well as introduce opportunities for purposeful bias. Additionally, in order to perform quality analysis, the operator must have information about the technical specifications the part must meet. These specifications will likely contain intellectual property of the parts including geometric, material and process information. Providing this intellectual property directly to operations increases the risk of intellectual property loss or theft.

In the quality control embodiment, an inspection profile may be added to the DSI container so that the confidentiality and integrity of the inspection profile is protected. The inspection profile will be used in conjunction with sensors to determine whether a physical part has defects. Because the DSI container supports any number of files and any file type, the inspection profile may contain a data set for a pre-defined algorithm, a data-set with an algorithm, or an application that will execute an algorithm. Both in situ monitoring and post-process measurement are supported by the inspection profile. The workflow application enables the extraction of the inspection profile within a trusted and secure execution space.

It is advantageous to protect the implementation of the inspection process. Both in situ and offline processes will be supported. The trusted process monitoring space may be implemented within a trusted hardware device, within a secure enclave, or within a physically secure computing system. All sensor data used by the inspection process may be inputs to the inspection process either through file transfer, or real-time data capture. The inspection algorithm may be implemented as a pre-installed executable program that can be selected by the workflow application or as an executable program that is transported within the DSI container and installed by the workflow application. Transporting the inspection process algorithms or applications within the DSI container will allow for unique inspection processes to be implemented for each part.

The process steps implemented as part of the inspection process will be defined as part of the workflow process within the Authorization APL as described previously. For example, the inspection process may require acquiring X sensor data from Y machine via in situ monitoring, then will require providing the data to an inspection application stored in the DSI container, then sending the output of the inspection application to the digital certification system.

In order to provide an auditable record of the digital manufacturing process, a digital certificate of conformity (COC) can be created. This certificate may contain a chain of trust from all processes, including machines and applications, used to produce the part in the digital manufacturing workflow and can provide information on the completion status of each. The workflow application is tasked to create the COC once all workflow operations are complete. In addition to the inspection processes, any pre-manufacturing processes, such as adding a serial number to the build file, as well as the manufacturing process will be addressed by the COC. In this way, the customer will have a trusted and auditable record of the successful completion of each workflow and inspection operation required to produce a part.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A digital manufacturing system, comprising:
   a hardware computing device configured to:
   store one or more digital supply item (DSI) containers configured for use with a first digital manufacturing workflow process and a second digital manufacturing process, the one or more DSI containers comprising a first DSI container comprising:
   an encrypted portion including an encrypted version of one or more private files, wherein:
   in the encrypted portion, the one or more private files are encrypted with one or more symmetric keys and one or more initialization vectors, and the one or more private files are identified by at least one file information block comprising one or more parameters comprising one or more of a key to encrypt a selected file, at least one initialization vector, a hash digest, a file number, a compression method, an uncompressed size, or a file name, wherein a first private file of the one or more private files represents a payload file, and wherein the first private file comprises one or more of an image file, a schematic file, a build file, or a computer aided design drawing;
   obtain one or more authorization authorized policy lists (APLs), a first authorization APL of the one or more authorization APLs associated with at least the first DSI container, the first authorization APL defining criteria for authorizing the first digital manufacturing workflow process based on at least the first DSI container, at least one authorization APL of the one or more authorization APLs defining criteria for authorizing the second digital manufacturing workflow process based on at least one DSI container of the one or more DSI containers;
   implement the first digital manufacturing workflow process based on at least the first DSI container and the first authorization APL; and
   based on successful completion of the first digital manufacturing workflow process, implement the second digital manufacturing workflow process based on the at least one DSI container and the at least one authorization APL.

2. The digital manufacturing system of claim 1, wherein to implement the first digital manufacturing workflow process, the hardware computing device is further configured to:
   decrypt the encrypted version of the one or more private files of the encrypted portion using the first authorization APL.

3. The digital manufacturing system of claim 2, wherein the first authorization APL comprises non-private identification information describing the first DSI container.

4. The digital manufacturing system of claim 1, wherein the at least one file information block comprises an unencrypted parameter configured to identify a file number of a first private file of the one or more private files.

5. The digital manufacturing system of claim 1, wherein, in the encrypted portion, each of the one or more private files is compressed.

6. The digital manufacturing system of claim 1, wherein, in the encrypted portion, each of the one or more private files is protected with a cryptographic digital signature.

7. The digital manufacturing system of claim 1, wherein, in the encrypted portion, a first private file of the one or more private files and one or more of the at least one file information block are encrypted with an RSA encryption key of an authorized receiver.

8. The digital manufacturing system of claim 1, wherein the first DSI container comprises an uncompressed archive.

9. The digital manufacturing system of claim 1, wherein the hash digest corresponds to a hash table of the encrypted portion.

10. The digital manufacturing system of claim 1, wherein to implement the first digital manufacturing workflow process, the hardware computing device is further configured to:
    generate a second DSI container of the one or more DSI containers, wherein the at least one DSI container comprises the second DSI container.

11. The digital manufacturing system of claim 1, wherein to implement the first digital manufacturing workflow process, the hardware computing device is further configured to:
    communicate the first DSI container.

12. The digital manufacturing system of claim 1, wherein to implement the second digital manufacturing workflow process, the hardware computing device is further configured to:
    cause a manufacturing device to manufacture an object based on the at least one DSI container.

13. The digital manufacturing system of claim 1, wherein, in the encrypted portion, each of the one or more private files is encrypted separately with a respective unique symmetric key and a respective initialization vector.

14. The digital manufacturing system of claim 1, wherein the at least one DSI container comprises the first DSI container, and the at least one authorization APL comprises the first authorization APL.

15. The digital manufacturing system of claim 1, wherein the at least one DSI container comprises a second DSI container, and the at least one authorization APL comprises as second authorization APL.

16. The digital manufacturing system of claim 1, wherein the at least one DSI container comprises the first DSI container, and the at least one authorization APL comprises a second authorization APL.

17. The digital manufacturing system of claim 1, wherein the at least one DSI container comprises a second DSI container, and the at least one authorization APL comprises the first authorization APL.

18. The digital manufacturing system of claim 1, wherein the first authorization APL indicates a location of a second DSI container, wherein the at least one DSI container comprises the second DSI container.

* * * * *